United States Patent Office 2,724,651
Patented Nov. 22, 1955

2,724,651

PRODUCTION OF FISH PRODUCT

William F. Hampton and Edward J. Maher, Reading, Mass., assignors to General Foods Corporation, New York, N. Y., a corporation of Delaware No Drawing. Application December 1, 1952,
Serial No. 323,498

4 Claims. (Cl. 99—195)

The present invention relates to a process for producing a precooked fish product, and more particularly, to a frozen, precooked product of the deep fat fried type.

An object of the invention is to provide a precooked fish product of the deep fat fried type in any desired size or shape, which permits utilization of different sized fish pieces and, moreover, pieces of different varieties in the same product.

The process of the present invention involves freezing fish pieces into a relatively large unit which is then subdivided into smaller, consumer-sized units to which batter and breading material are applied and which are thereafter fried in deep fat to at least partially cook the same, cooled, and packaged. The packaged product is then frozen and stored at about 0° F. in the manner generally employed in moving frozen food products through the channels of commerce. In order to have a hot, fully cooked product ready for serving it is only necessary for the consumer or the housewife to heat the product by placing the same in an oven at 425° F. for 12–15 minutes, 20 minutes of heating being required if a harder crust is desired. The fish material which may be employed in carrying out the process of the present invention includes red fish (ocean perch), cod, haddock, whiting, pollock, halibut, salmon, herring, swordfish and the like. Shellfish, such as oysters, scallops, clams, shrimp, and the like, may also be employed in accordance with the process of the present invention, although generally it is more practical from a commercial standpoint to handle such materials as individual units and not to freeze the same into slabs for subsequent formation into sticks or other smaller forms.

The fish pieces, preferably fillets, are placed in metal pans and covered with metal covers so that a uniform block or slab will result after freezing. Generally, it is preferred that the pan be of such a depth that a frozen slab of about ¾ in. thickness is obtained. The fish pieces or fillets are so placed in the pans that a certain amount of interlacing of pieces is obtained. None of the pieces or fillets should be doubled over but, rather, all should lie flat in the pan. The slabs may be frozen using plate frosters and at such a rate that the temperature of the slabs is reduced to 0° F. in 3 hours or less. Thereafter, the frozen slabs are preferably kept at a temperature of 0° F. or below until needed for production.

The slabs are cut into sticks of any suitable size, one ounce sticks being judged preferable from a consumer standpoint. Sticks cut to 3¾ in. x ¾ in. x ½ in. will usually provide the desired one ounce piece. Any suitable method may be employed for the purpose of cutting the sticks, a series of multiple circular saws being preferred from the standpoint of operating efficiency, particularly loss of fish as sawdust. Band saws and other types of cutters have also been employed satisfactorily. In addition to the aforementioned stick, the slab may be cut to provide ¾ in. cubes and, of course, if larger cubes are desired, a thicker slab may be frozen.

The sticks prepared as aforementioned are passed to a foraminous horizontal conveyor and thence to an enrober wherein they encounter one or more curtains of batter. Excess batter drains from the sticks through the traveling screen or foraminous conveyor and after the sticks emerge from the enrober they encounter a low pressure air stream which insures the removal of excess batter. The conveyor is elevated above the solid bottom pan handling the batter so that application of batter to the underside of the sticks is assured. A suitable batter is prepared from whole egg, corn starch and seasoning and contains about 60% water and has a viscosity of 400–500 centipoises when measured by a Brookfield viscometer using a Number 3 spindle at 20 R. P. M.

After the application of the batter, the sticks are then coated with a breading material as they are carried by the aforementioned foraminous conveyor. The manner of application in the case of the breading is somewhat similar to that employed with the batter, the sticks encountering two curtains of breading or bread crumbs to insure uniform distribution. Uniform coating of the bottom of the stick is provided by raising the level of the conveyor above the solid bottom of the breader so that the stick is virtually immersed in breading material.

The breaded sticks are then placed in wire mesh trays and fried by complete immersion in oil at 370°–375° F. for 75–85 seconds. A suitable oil for this purpose is hydrogenated cottonseed oil which is preferred from the standpoint of its operating characteristics. It has been found that in commercial batch-type friers where no circulation of fat is provided if the sticks are horizontal the undersides do not become sufficiently cooked. Accordingly, it is preferred to position the sticks with an inclination of 30–40° from the horizontal. Moreover, positioning the sticks in the manner aforementioned facilitates drainage of the fat therefrom. Generally, there should be as little delay as possible in transferring the bread sticks to the coker, although a delay of several minutes can be had without any particularly adverse effects. Since the presence of crumbs, batter, moisture and the like in the fat accelerate the formation of free fatty acids, these substances should be removed from the cooking fat as frequently as possible.

The precooked sticks after removal from the cooker are next cooled by allowing them to stand for 20 or 30 minutes, preferably under an exhaust hood. It is preferred that the sticks be cooled below 100° F. since this prevents the sticks or individual pieces from sticking together in the package and also reduces the load on the freezers which are employed in the subsequent freezing operation. The sticks or pieces are then packed in a suitable consumer or retail weight and size package, and generally one containing about 10 sticks and weighing about 10 ounces. The packages containing the fish sticks are frozen to 0° F. at such a rate as to reach this temperature in about 3 hours. Any suitable type of freezer may be employed, a plate freezer having been found to be entirely satisfactory. It is best to start this freezing within one hour after the sticks have been packed, and preferably within a shorter time where possible.

The packaged product must be stored in the manner usually employed in the handling of frozen food products, a temperature of the order of 0° F. being best. The fish product after sale to the consumer is removed from the package and prepared for the table by being placed in an oven at 425° F. for 12–15 minutes, or 20 minutes if a crisper crust is desired.

What is claimed is:

1. A process for making a fish product which comprises freezing fish pieces into a relatively large unit, subdividing said unit into smaller, consumer-sized units, applying a batter and a breading material thereto, frying said units to at least partially cook the same, and packaging and freezing said product.

2. A process for making a fish product which comprises freezing fish pieces into a slab, subdividing said slab into small units of about one ounce by weight, applying a batter and a breading material thereto, deep fat frying said units to at least partially cook the same, and packaging and freezing said product.

3. A process for making a fish product which comprises freezing fish fillets in the form of a slab about ¾ inch thick, subdividing said slab into rectangular sticks of about 3¾ in. x ¾ in. x ½ in., applying a batter and a breading material thereto, deep fat frying said sticks at about 370°–375° F. for about 75–85 seconds, cooling said partially cooked sticks, packaging a plurality of said sticks in a common package and freezing said packaged product.

4. A process for making a fish product which comprises combining pieces of fish and freezing the combined pieces to form a substantially solid, integral mass, subdividing the frozen mass into consumer-sized units substantially all of which are formed of a plurality of fragments, coating the frozen units with a batter and subjecting the coated frozen units to deep fat frying, said batter being cooked to form a substantially continuous surface layer preventing disintegration of said units as they thaw throughout during cooking, and then refreezing the cooked units for storage and distribution to the consumer.

References Cited in the file of this patent

UNITED STATES PATENTS 1,864,285    Taylor _____ June 21, 1932

OTHER REFERENCES

"Quick Frozen Foods," June 1949, page 45.
"Food Engineering," June 1951, page 160.
"Quick Frozen Foods," December 1951, page 82.